(12) United States Patent
Nakazawa et al.

(10) Patent No.: US 12,407,911 B2
(45) Date of Patent: Sep. 2, 2025

(54) IMAGE PROCESSING APPARATUS AND METHOD WITH CAPTURE DIRECTION RECOMMENDATIONS

(71) Applicant: Rakuten Group, Inc., Tokyo (JP)

(72) Inventors: Mitsuru Nakazawa, Tokyo (JP); Takashi Tomooka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 77 days.

(21) Appl. No.: 18/088,044

(22) Filed: Dec. 23, 2022

(65) Prior Publication Data

US 2023/0209171 A1    Jun. 29, 2023

(30) Foreign Application Priority Data

Dec. 24, 2021  (JP) ................. 2021-211600

(51) Int. Cl.
| | |
|---|---|
| *H04N 23/60* | (2023.01) |
| *G06Q 30/0601* | (2023.01) |
| *G06T 11/60* | (2006.01) |
| *G06V 10/40* | (2022.01) |

(52) U.S. Cl.
CPC ......... *H04N 23/60* (2023.01); *G06Q 30/0631* (2013.01); *G06T 11/60* (2013.01); *G06V 10/40* (2022.01)

(58) Field of Classification Search
CPC ...... H04N 23/60; H04N 23/61; H04N 23/695; G06Q 30/0631; G06Q 30/02; G06Q 30/06; G06T 11/60; G06V 10/40; G06V 20/20

See application file for complete search history.

(56) References Cited

U.S. PATENT DOCUMENTS

| | | | |
|---|---|---|---|
| 11,941,676 B2* | 3/2024 | Gupta | G06V 20/20 |
| 2012/0226550 A1* | 9/2012 | Ryu | G06Q 30/02 |
| | | | 705/14.52 |
| 2013/0208005 A1 | 8/2013 | Kasahara et al. | |
| 2014/0143233 A1* | 5/2014 | Rong | G06Q 30/02 |
| | | | 707/722 |
| 2015/0229838 A1* | 8/2015 | Hakim | H04N 23/634 |
| | | | 348/333.02 |
| 2016/0292757 A1* | 10/2016 | Bandara | G06Q 30/06 |
| 2019/0222772 A1* | 7/2019 | Yang | H04N 23/45 |
| 2019/0287154 A1* | 9/2019 | Kakinuma | G06Q 30/0631 |
| 2021/0004401 A1* | 1/2021 | Sonoda | G06F 16/535 |
| 2021/0118311 A1* | 4/2021 | Nakazawa | G08G 5/0026 |
| 2021/0192597 A1* | 6/2021 | Thirunavukkarasu | G06Q 30/0631 |

(Continued)

FOREIGN PATENT DOCUMENTS

| | | |
|---|---|---|
| JP | 2013-128251 A | 6/2013 |
| JP | 2013-165366 A | 8/2013 |
| JP | 2021-077131 A | 5/2021 |

*Primary Examiner* — Padma Haliyur
(74) *Attorney, Agent, or Firm* — Sughrue Mion, PLLC

(57) ABSTRACT

Disclosed is an image processing apparatus including a receiving section that receives a captured image of a target object, a recognizing section that performs recognition of the target object by extracting feature points of the target object on the basis of the captured image, a recommending section that gives recommendation regarding an imaging direction on the basis of a type of the target object, and an instruction section that gives an instruction on a specific direction to capture an image of the target object, on the basis of a result of the recognition and a result of the recommendation.

10 Claims, 7 Drawing Sheets

(56) References Cited

U.S. PATENT DOCUMENTS

| | | | |
|---|---|---|---|
| 2022/0171966 A1* | 6/2022 | Nakazawa | G06F 40/30 |
| 2023/0019794 A1* | 1/2023 | Saville | G06Q 30/0282 |
| 2023/0093756 A1* | 3/2023 | Banerjee | G06Q 30/0631 |
| | | | 705/26.7 |
| 2023/0206299 A1* | 6/2023 | Saiswaroop | G06V 20/64 |
| | | | 705/26.64 |

* cited by examiner

FIG. 2

| NAME OF TARGET OBJECT | RECOMMENDED DIRECTION INFORMATION |
|---|---|
| aaaa | $(\theta 1, \varphi 1), (\theta 2, \varphi 2) \cdots$ |
| bbbb | $(\theta 1, \varphi 1), (\theta 3, \varphi 3) \cdots$ |
| ⋮ | ⋮ |

IMAGE PROCESSING APPARATUS AND METHOD WITH CAPTURE DIRECTION RECOMMENDATIONS

CROSS REFERENCE TO RELATED APPLICATIONS

This non-provisional application claims priority under 35 U.S.C. § 119(a) on Patent Application No. 2021-211600 filed in Japan on Dec. 24, 2021, the entire contents of which are hereby incorporated by reference.

BACKGROUND

The present disclosure relates to an image processing apparatus, an image processing method, and a program that gives an instruction related to the capturing of an image.

Electronic commerce services such as what is called customer to customer (C2C) marketplace services which act as an intermediary between users and allow them to buy and sell items or the like from each other have been widely used. In the electronic commerce services, users may capture images of items and post the captured images. However, even if the users sell the same item, since they have different levels of skill in capturing images, sales of the item may differ among them.

SUMMARY

Japanese Patent Laid-Open No. 2021-077131 discloses a composition advice system that includes learning means for learning evaluations related to compositions of a plurality of images posted on a social networking service (SNS), extracting means for analyzing an image captured by a user operating a terminal and for extracting feature information therefrom, and notifying means for, when a composition is provisionally designated by an operation made by the user and an image is captured according to the designated composition, notifying the user of information indicating an evaluation of the captured image which is presumed to be given on the SNS, on the basis of the extracted feature information.

By being given such advice on composition, the user may be instructed to capture an image of an item according to such a composition as to be evaluated as appropriate. However, according to a technology disclosed in Japanese Patent Laid-Open No. 2021-077131, the user needs to capture images of the item while changing the composition thereof (determine a composition) and obtain advice on composition. Hence, it may be difficult for the user to recognize the specific composition that is appropriate to capture an image of the item.

The present disclosure has been made in view of the above-described actual situation. It is desirable to provide an image processing apparatus and a program that can instruct a user to capture an image in a specific imaging direction.

According to one aspect of the present disclosure, there is provided an image processing apparatus including a receiving section that receives a captured image of a target object, a recognizing section that performs recognition of the target object by extracting feature points of the target object on the basis of the captured image, a recommending section that gives recommendation regarding an imaging direction on the basis of a type of the target object, and an instruction section that gives an instruction on a specific direction to capture an image of the target object, on the basis of a result of the recognition and a result of the recommendation.

According to another aspect of the present disclosure, there is provided an image processing method including, by a processor of a computer, receiving a captured image of a target object, performing recognition of the target object by extracting feature points of the target object on the basis of the captured image, giving recommendation regarding an imaging direction on the basis of a type of the target object, and giving a user an instruction on a specific direction to capture an image of the target object, on the basis of a result of the recognition and a result of the recommendation.

According to still another aspect of the present disclosure, there is provided a computer-readable and non-transitory medium storing a program for causing a computer to function as a receiving section that receives a captured image of a target object, a recognizing section that performs recognition of the target object by extracting feature points of the target object on the basis of the captured image, a recommending section that gives recommendation regarding an imaging direction on the basis of a type of the target object, and an instruction section that gives an instruction on a specific direction to capture an image of the target object, on the basis of a result of the recognition and a result of the recommendation.

According to the aspect of the present disclosure, it is possible to instruct a user to capture an image in a specific direction.

BRIEF DESCRIPTION OF THE DRAWINGS

FIG. 2 is an explanatory diagram illustrating an example of the details of a database used by the image processing apparatus according to the embodiment of the present disclosure;

DETAILED DESCRIPTION OF THE PREFERRED EMBODIMENT

Figure 1:
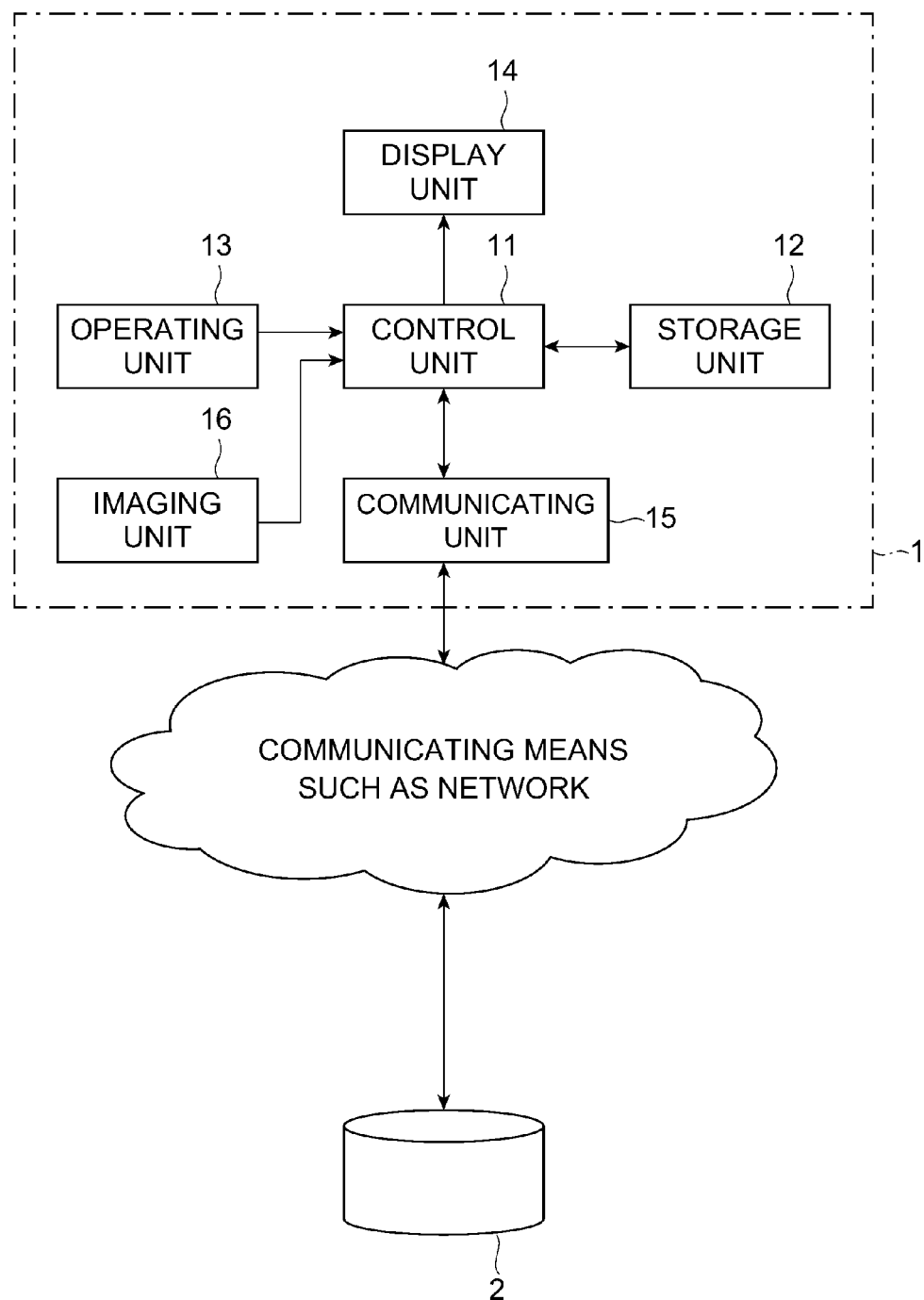
FIG. 1 is a block diagram illustrating an example of a configuration of an image processing apparatus according to an embodiment of the present disclosure.

An embodiment of the present disclosure will be described with reference to the drawings. An example of the image processing apparatus 1 according to the embodiment of the present disclosure can be implemented by an information processing apparatus having a camera function, such as a smart phone. As illustrated in FIG. 1, the example of the image processing apparatus 1 includes a control unit 11, a storage unit 12, an operating unit 13, a display unit 14, a communicating unit 15, and an imaging unit 16. In addition, the image processing apparatus 1 may communicably be connected to a server apparatus 2 via a network.

The control unit 11 is a program-controlled device such as a central processing unit (CPU). The control unit 11 operates according to a program stored in the storage unit 12. In the example of the present embodiment, the control unit 11 controls the imaging unit 16 according to an instruction from a user and receives a captured image of a target object as a subject. Here, receiving the captured image may refer to temporarily storing the image of the target object captured by the imaging unit 16 as a preview image in a volatile memory such as a random-access memory (RAM), or may also refer to recording the image of the target object captured by the imaging unit 16 in the storage unit 12. Further, the control unit 11 performs recognition of the target object on the basis of the received captured image and gives an instruction on a specific direction to capture an image of the target object as the subject, on the basis of a result of this recognition. An example of the operation of the control unit 11 will be described later.

In the present embodiment, the imaging direction refers to information regarding the angle and position of a device (camera or the like) having an imaging function. For example, in a case where an elevation angle from an xy plane to be described later is large, the imaging direction is construed as indicating a high angle and a high position. Incidentally, in the present specification, the imaging direction will also simply be referred to as a direction.

The storage unit 12 is a memory device, a disk device, or the like. The storage unit 12 stores the program to be executed by the control unit 11. This program may be provided in a state of being stored in a computer-readable and non-transitory recording medium, and be copied to the storage unit 12.

The operating unit 13 is a touch panel or the like disposed in such a manner as to be superposed on the display unit 14. The operating unit 13 receives an operation made by a user and outputs information indicating the details of the operation to the control unit 11. The display unit 14 is a display or the like. The display unit 14 displays an image according to an instruction inputted from the control unit 11.

The communicating unit 15 is an interface for performing communication via a network or a mobile-phone network. For example, the communicating unit 15 outputs data received via the network to the control unit 11 and also transmits data to an external server or the like via the network according to an instruction inputted from the control unit 11. The imaging unit 16 is a camera or the like. The imaging unit 16 sequentially outputs captured images to the control unit 11.

In the present embodiment, the server apparatus 2 that is communicably connected to the image processing apparatus 1 receives, from the image processing apparatus 1, an upload of an image captured and recorded in the image processing apparatus 1. In addition, the server apparatus 2 receives information for identifying the type of the target object to be imaged (information indicating the name, shape, or the like of the target object) from the image processing apparatus 1 and provides information indicating an appropriate direction to capture an image of the target object.

As an example of a method for implementing the processing of providing the information indicating an appropriate direction, in the present embodiment, the server apparatus 2 stores a database in which information regarding the name or the like of an target object is associated with information regarding an appropriate direction to capture an image of the target object (this information will be referred to as recommended direction information) in advance, as illustrated in FIG. 2. In a case where the server apparatus 2 provides what is called a C2C marketplace service, for example, it is sufficient to determine the recommended direction information statistically or by an operator on the basis of the directions in which images of items having the same name as the target object (same item name) were captured when the items were provided in the marketplace and on the basis of the past sales of the items.

In addition, this recommended direction information can be expressed by $(\theta, \varphi)$ where the height direction of the target object is along a $\zeta$-axis, an angle of the imaging direction (direction in which the camera is disposed) about the $\zeta$-axis with respect to the front direction of the target object is $\theta$, and an elevation angle from an origin (that may be the center of a bottom surface of a hexahedron circumscribing the target object (bottom surface of the hexahedron coincides with a bottom surface of the target object)) is $\varphi$.

Further, the server apparatus 2 receives, together with the information for identifying the target object to be imaged, a request for the recommended direction information from the image processing apparatus 1. In response to the request, the server apparatus 2 obtains the recommended direction information associated with information regarding the name or the like of the target object identified by the received information, and transmits the obtained recommended direction information to the image processing apparatus 1 that is a request source.

Figure 3:
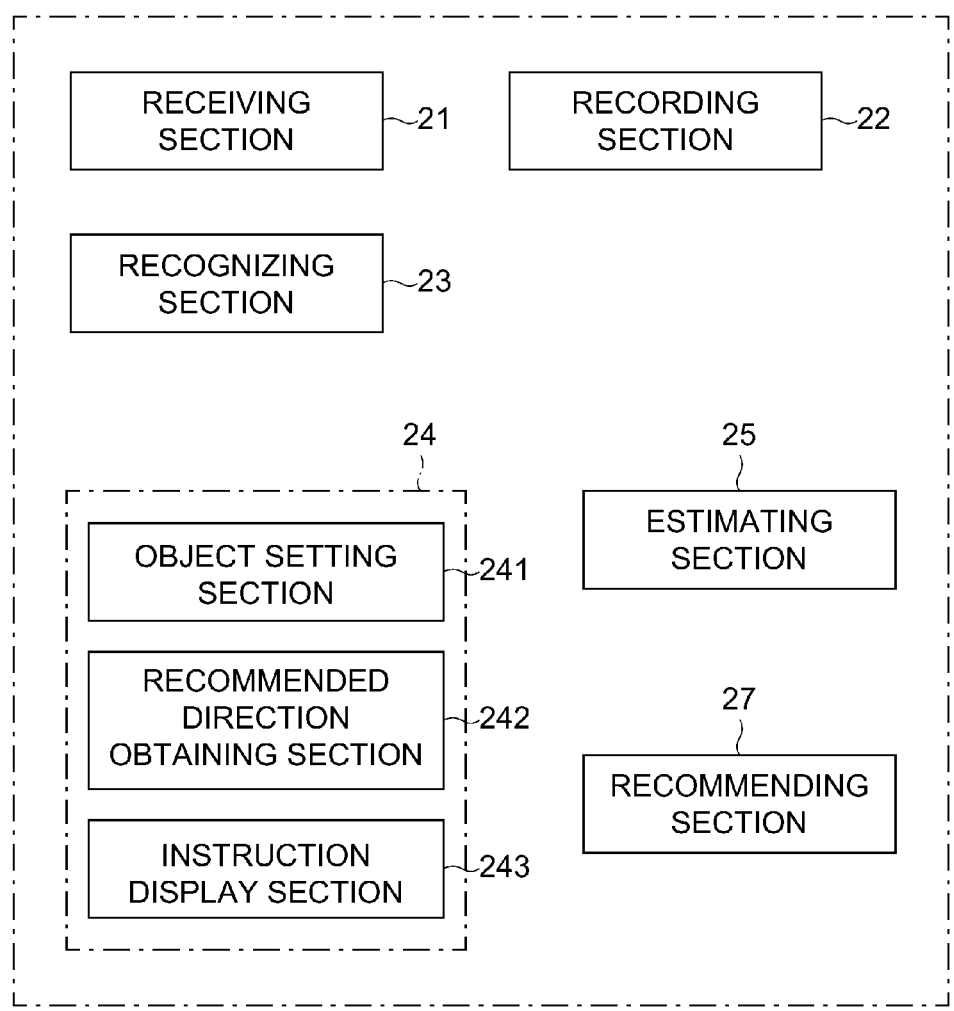
FIG. 3 is a functional block diagram illustrating an example of the image processing apparatus according to the embodiment of the present disclosure.

The operation of the control unit 11 according to the present embodiment will next be described. In the present embodiment, by executing the program stored in the storage unit 12, the control unit 11 implements a configuration functionally including a receiving section 21 (corresponding to receiving section), a recording section 22, a recognizing section 23 (corresponding to recognizing section), an instruction section 24 (corresponding to instruction section), and an estimating section 25 (corresponding to estimating section), as illustrated in FIG. 3. In addition, the control unit 11 may implement a configuration functionally further including a recommending section 27 (corresponding to recommending section). It is to be noted that each piece of means or each step may have a configuration obtained by combining configurations of the respective sections as appropriate and that the configuration thereof is not limited to a particular one.

A user places a target object to be imaged on a flat surface of a desk or the like and operates the image processing apparatus 1 (for example, a smart phone) to start the program. The imaging unit 16 thereafter sequentially outputs images captured by the camera.

The receiving section 21 sequentially receives the images captured by the imaging unit 16 and inputted from the imaging unit 16. The receiving section 21 may output the captured images to the display unit 14 to display the captured images thereon.

The recording section 22 records the last captured image received by the receiving section 21 as a captured image in the storage unit 12 according to intention input from the user.

The recognizing section 23 uses the captured image received by the receiving section 21 or the captured image recorded by the recording section 22, as a processing target (hereinafter referred to as a processing target image), and recognizes the target object appearing in the processing target image. Specifically, the recognizing section 23 assumes that the processing target image is obtained by imaging a three-dimensional space, and sets virtual three-dimensional coordinates (XYZ Cartesian coordinates).

Specifically, the recognizing section 23 extracts predetermined feature points (which may be image feature points obtained by a scale-invariant feature transform (SIFT) or the like) from a processing target image, detects a plane on which the target object is disposed, sets one point on this plane to an origin, and defines XY Cartesian coordinates in parallel with the plane. For example, the recognizing section 23 sets, to a positive direction of Y-coordinates, a direction obtained by projecting a line-of-sight direction of a camera in the last captured processing target image, onto the plane at a time of the coordinate defining processing. Further, the recognizing section 23 sets, to a positive direction of X-coordinates, a direction which is orthogonal to the Y-coordinates and which extends in a right direction when viewed in the positive direction of the Y-coordinates. In addition, the recognizing section 23 sets, to a positive direction of Z-coordinates, a direction normal to the plane. Thus, the recognizing section 23 defines virtual XYZ Cartesian coordinates (referred to as world coordinates). Needless to say, such a method of defining coordinates as described above is an example, and another method may be adopted.

Further, the recognizing section 23 extracts predetermined feature points of the target object from the processing target image and identifies a range in which the target object appears in the image (for example, a rectangular parallelepiped circumscribing the target object) as a bounding box. That is, the recognizing section 23 identifies and obtains a set of vertex coordinates of a polyhedron as the bounding box. Incidentally, the recognizing section 23 sets this rectangular parallelepiped such that the bottom surface of the rectangular parallelepiped coincides with the above-described plane, sets the center of the bottom surface of the rectangular parallelepiped (which is expressed in the world coordinate system) as an origin, and provisionally sets a coordinate system of an x'-, a y'-, and a z-axis which are respectively parallel with the X-, Y-, and Z-axes of the world coordinates. Then, the recognizing section 23 selects one surface of the polyhedron, which is the bounding box, as a front surface by a predetermined method, rotates the x'- and y'-axes of the provisionally set coordinate system about the z-axis such that the y'-axis corresponds to a direction normal to the front surface (and the positive direction of the y'-axis corresponds to a direction extending from the front surface of the bounding box to the target object), and thus obtains a rotational angle β. The recognizing section 23 sets the directions of the x'- and y'-axes after being rotated by the rotational angle β, as an x-axis and a y-axis, respectively, and thus establishes an xyz Cartesian coordinate system of the target object (target object coordinate system).

Here, as a method of selecting the front surface, a method of setting, as the front surface, a surface that is the nearest surface in an imaging direction in which a first image is captured and that is the largest surface among the surfaces of the bounding box, a method of making a user select the front surface, and other methods are available, for example. However, the method of selecting the front surface is not limited to these examples as long as the method can set the direction of the front surface of the target object.

In addition, the recognizing section 23 may recognize the name of the target object (item name in a case where the target object is an item) or the like through such processing as comparison with item images of objects for reference which are registered in advance. The recognizing section 23 may determine the shape of the target object on the basis of a result of the recognition of the target object.

Also, the recognizing section 23 may identify the type of the target object by performing recognition of the target object. In the present embodiment, identifying the target object may be, for example, obtaining a classification of the target object on the basis of feature points (corresponding to feature quantities) of the target object which are obtained by the recognition of the target object, by the use of a classifier implemented by a machine learning model or the like with the feature quantities as input. Further, the target object may be identified through an image search or pattern matching based on the feature points of the target object, and the way of identifying the target object is not limited to a particular one.

The processing of setting the world coordinate system and the target object coordinate system or recognizing the name and the like can be performed by using an object recognizing function of an ordinary augmented reality (AR) processing module (for example, ARKit provided by Apple Inc. in the U.S., ARCore provided by Google LLC in the U.S., or the like) or by machine learning (processing described in https://ai.googleblog.com/2020/03/real-time-3d-object-detection-on-mobile.html, processing described in Arsalan Mousavian, et al., 3D Bounding Box Estimation Using Deep Learning and Geometry, arXiv: 1612.00496v2, or the like), and therefore, the detailed description thereof will be omitted here. Incidentally, in the present embodiment, in order to assist in object recognition, a pattern image such as an AR marker may be arranged on a flat surface of a desk or the like on which the target object is disposed. For example, a sheet having an AR marker formed thereon may be disposed on the desk, and the target object may be placed on the sheet and imaged.

The instruction section 24 gives a user an instruction on a specific direction to capture an image of the target object, on the basis of a result of the recognition of the imaged target object by the recognizing section 23. In the example of the present embodiment, as illustrated in FIG. 3, the instruction section 24 includes an object setting section 241, a recommended direction obtaining section 242, and an instruction display section 243.

The object setting section 241 sets a virtual surrounding body of a predetermined shape (such as hemispherical shape) which circumscribes the bounding box surrounding the imaged target object, the bounding box being obtained by the recognizing section 23, or which includes the bounding box. Here, for example, the virtual surrounding body corresponds to an extended reality (XR) object such as an AR object. Incidentally, while an example in which the virtual surrounding body is set to circumscribe the bounding box or include the bounding box is described in the present embodiment, it is sufficient if the virtual surrounding body is set to include the parts of the target object corresponding to the feature points defined thereon, and a form thereof is not limited to the above-described example.

For example, the instruction section 24 may determine and set the shape of the virtual surrounding body, on the basis of the shape of the target object which is determined by the recognizing section 23. For example, in a case where the target object has a rectangular box shape, the instruction section 24 may set a virtual surrounding body with a rectangular shape obtained by virtually enlarging the shape of the target object. Alternatively, in a case where the target object has a flat shape, the instruction section 24 may set a virtual surrounding body with a flat rectangular shape in place of a hemispherical shape. Incidentally, the instruction section 24 may refer to a predetermined database or the like to obtain information regarding a shape determined in advance in association with the name or type of the target object, and may set a virtual surrounding body of the shape identified by the obtained information.

Figure 4:
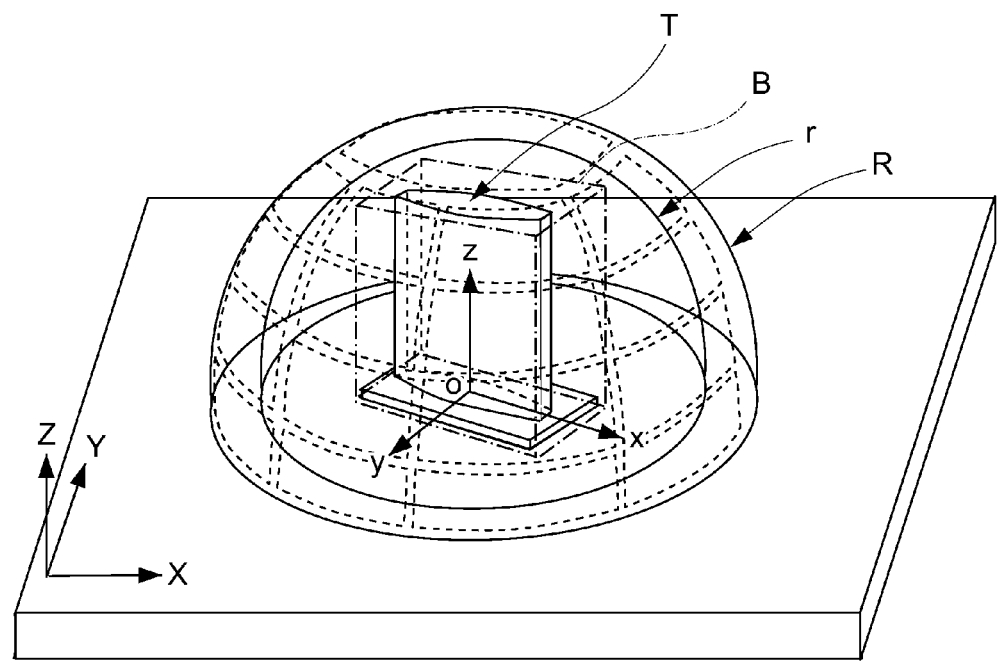
FIG. 4 is an explanatory diagram illustrating an example of a virtual surrounding body set by the image processing apparatus according to the embodiment of the present disclosure.

For example, as illustrated in FIG. 4, the object setting section 241 sets the center of a processing target image which is a captured image of the target object (T), to the origin of the target object coordinate system, virtually sets a hemisphere (r) circumscribing the bounding box (B) set by the recognizing section 23, and further sets a hemisphere (R) obtained by increasing the radius of the hemisphere (r) at a predetermined ratio. Incidentally, the hemisphere (R) may be set to directly include the feature points of the target object or the bounding box (B).

For example, the object setting section 241 further divides a hemisphere surface, which is the surface of the virtual surrounding body, into a plurality of surface objects, and obtains information regarding coordinates indicating each of the surface objects. Here, the hemisphere surface refers to the hemisphere (R). In addition, here, each of the surface objects may be a flat surface. In that case, the hemisphere surface is approximately divided into a plurality of surface objects (corresponding to a mesh), and the information regarding the coordinates indicating each of the surface objects is the value of coordinates of a vertex of each surface object (which may be a value in the target object coordinate system). This dividing method is not limited to a particular one, and it is sufficient if an appropriate method such as a method of mesh division using a finite element method or a Catmull-Clark division (that can be implemented by using an OpenSubDiv library or the like) is adopted. In the present example, the above-described plurality of surface objects correspond to a plurality of virtual objects in the embodiment of the present disclosure. Incidentally, the shape and size of the surface objects obtained by the division do not have to be fixed, and the hemisphere surface may be divided into a plurality of surface objects including meshes of different shapes and sizes.

In addition, the recommended direction obtaining section 242 transmits the information regarding the name of the target object (information for identifying the type of the target object), which is obtained by the recognizing section 23, to the server apparatus 2, and requests recommended direction information from the server apparatus 2. When the server apparatus 2 transmits the recommended direction information in response to the request, the recommended direction obtaining section 242 receives the recommended direction information.

Alternatively, the recommended direction obtaining section 242 receives the recommended direction information outputted by the recommending section 27, which is to be described later, on the basis of the information for identifying the type of the target object which is obtained by the recognizing section 23, for example.

After the object setting section 241 sets a virtual object (virtual surrounding body) and the recommended direction obtaining section 242 receives the recommended direction information, each time the receiving section 21 receives a captured image, the instruction display section 243 displays the virtual surrounding body in such a manner as to superimpose the virtual surrounding body on the received image.

Each time the receiving section 21 receives a captured image, the instruction display section 243 determines, in the captured image, each axial direction of the world coordinate system set by the recognizing section 23. This processing can be performed by feature point tracking processing, and can be performed by using the above-described AR processing module or the like. In addition, the instruction display section 243 sets the target object coordinate system on the basis of the world coordinate system (with the use of the coordinates of the origin in the world coordinate system and the rotational angle β of the x- and y-coordinate axes with respect to an XY coordinate system).

Then, the instruction display section 243 displays, in a highlighted manner, some of regions on the above-described virtual surrounding body on the basis of the recommended direction information received by the recommended direction obtaining section 242. For example, the instruction display section 243 identifies at least one surface object from among the above-described surface objects that are virtual objects, on the basis of the recommended direction information received by the recommended direction obtaining section 242. As a concrete example of how to identify a surface object, the instruction display section 243 identifies a surface object whose angle information is the closest to the recommended direction information among the above-described surface objects that are virtual objects. Here, the angle information indicates a direction that is a direction normal to the surface object (direction parallel with a normal to the largest surface of a hexahedron circumscribing the surface object in a case where the surface object has a curved surface) and that is a direction of going away from the origin of the target object coordinate system (which will be referred to as a surface direction).

Here, the angle information indicating the surface direction is defined by a method enabling comparison with the recommended direction information. In this case, the information is represented by the angle $\theta'$ of a line segment about the z-axis in the target object coordinate system, the line segment being parallel with the surface direction in the target object coordinate system and passing through the origin of the target object coordinate system, and by an elevation angle $\varphi'$ from the xy plane including the origin.

Incidentally, in a case where the recommended direction obtaining section 242 obtains a plurality of pieces of recommended direction information from the server apparatus 2, the instruction display section 243 identifies a surface object whose surface direction is the closest to each piece of recommended direction information.

The instruction display section 243 displays, in a highlighted manner, the surface object identified on the basis of the recommended direction information corresponding to the imaging direction which has been designated. In other words, the instruction display section 243 superimposes and displays the surface object which is identified on the basis of the recommended direction information from among the plurality of surface objects generated as described above and the other surface objects on the captured image received by the receiving section 21, in such a manner that the identified surface object and the other surface objects can be distinguished from each other. For example, the instruction display section 243 fills the surface object identified on the basis of the recommended direction information with a certain color, fills the other surface objects with a different color, and translucently synthesizes the resulting surface objects with the captured image.

The estimating section 25 estimates the imaging direction on the basis of the captured image received by the receiving section 21. The estimating section 25 obtains an angular difference a (rotational angle about the z-axis) between the y-coordinates in the target object coordinate system (xyz Cartesian coordinate system) set by the recognizing section 23 and the line-of-sight direction of the camera (direction normal to the plane of the image) and the angle (elevation angle) β of the line-of-sight direction of the camera from the xy plane. That is, this estimation can be performed by obtaining transformation parameters between a camera coordinate system and the target object coordinate system. In addition, through the estimation, the estimating section 25 may determine whether or not the captured image received by the receiving section 21 substantially coincides with the imaging direction which is designated by the instruction section 24.

The recommending section 27 may functionally be implemented by the control unit 11 of the image processing apparatus 1, or may be included in the server apparatus 2. The recommending section 27 performs processing of recommending an imaging direction on the basis of the type of the target object which is received from the instruction section 24. In the present embodiment, in the processing of recommending an imaging direction, the recommending section 27 determines a recommended direction (imaging direction to be recommended) on the basis of the type of the target object, determines recommended direction information, and updates the database (in which recommended imaging directions are recorded). Then, information regarding the determined recommended direction is outputted to the instruction section 24. In a case where the recommending section 27 is included in the server apparatus 2, the information regarding the recommended direction is outputted to the control unit 11 of the image processing apparatus 1 via the network.

Incidentally, here, the type of the target object may be information regarding the item name of the target object as already described, or may be information regarding the item category of the target object. The information regarding the type of the target object is not limited to a particular one as long as the information is useful for a user to identify the target object. In the present embodiment, the instruction section 24 gives an instruction on a specific direction to capture an image of the target object, on the basis of the information regarding the recommended direction which is outputted by the recommending section 27. In other words, the instruction section 24 gives a user an instruction to capture an image of the target object in the recommended direction determined by the recommending section 27.

The recommending section 27 may perform the processing of recommending an imaging direction on the basis of a result of the identification of the type of the target object by the recognizing section 23.

Further, the recommending section 27 may perform the processing of recommending the imaging direction in which to capture an image of the target object appearing in the captured image received by the receiving section 21, on the basis of each of the imaging directions in which images of target objects of the identical type were captured in the past. Here, for example, the "images of target objects of the identical type captured in the past" may be captured images uploaded in association with the past target objects, or may be captured images stored in a predetermined database to allow reference thereto. Here, for example, the past target objects may refer to items that were put up for sale in the past in the electronic commerce service such as the C2C marketplace service. It is to be noted that each of the imaging directions in which the images were captured in the past may be an imaging direction indicated by metadata accompanying the image captured in the past, or may be an imaging direction estimated on the basis of a known image recognition technology or a conventional image recognition technology for the image captured in the past.

In addition, for example, the recommending section 27 may perform the recommendation processing on the basis of an imaging direction that is one of the imaging directions in which the images of the target objects of the identical type were captured in the past and that relates to the captured image of the target object having a predetermined trade history. Here, the "target object having a predetermined trade history" refers to, for example, an item that was put up for sale and sold through electronic commerce transactions. That is, when capturing an image of a target object (item) in an appropriate direction and uploading the captured image may be determined as one of the factors of the past sale of the target object, the recommending section 27 may determine the imaging direction in which the target object was captured, as the recommended direction indicated by the recommended direction information.

Moreover, the recommending section 27 may perform the recommendation processing on the basis of an imaging direction that is one of the imaging directions in which the images of the target objects of the identical type were captured in the past and that relates to the captured image of the target object having, as the above-described "predetermined trade history," a trade history selected on the basis of an elapsed time from the putting up of the item for sale to the closing of a deal. Here, the recommending section 27 may select, for example, a predetermined number of top trade histories in increasing order of the elapsed time from the putting up of the item for sale to the closing of a deal. Incidentally, various types of information including the electronic commerce histories used in the present embodiment may be obtained by inquiring of the server apparatus 2 managing the electronic commerce service, or may be obtained by referring to data stored in a predetermined database.

Furthermore, the recommending section 27 may perform the recommendation processing on the basis of the number of views of item pages. For example, the recommending section 27 may perform the recommendation processing on the basis of an imaging direction that is one of imaging directions in which images of items of an identical type (or of an identical outer shape) were captured in the past and that corresponds to any of imaging directions related to the captured images of the items contained on item pages which are high in number of views and included in predetermined top viewed pages. It is assumed that the item page herein corresponds to an item page displayed on the Web in the electronic commerce service and includes a captured image of an item as an image typified by a thumbnail image or the like. The number of views of an item page in the present embodiment may be the number of times that a user selects the item page and views the details of the item or the like in the electronic commerce service, or may be the number of times that a user selects (e.g., clicks) a captured image of the item on the item page in the electronic commerce service. Incidentally, the various numbers of views of the item pages used in the present embodiment may be obtained by inquiring of the server apparatus 2 managing the electronic commerce service, or may be obtained by referring to data stored in a predetermined database.

<Operation>

The image processing apparatus 1 according to an example of the present embodiment has the above configuration and operates as follows. Incidentally, in the following example, suppose that the server apparatus 2 provides an electronic commerce service such as what is called a C2C marketplace service and receives an upload of an image of an item captured by a user, the item being to be put up for sale by the user in the C2C marketplace service.

In addition, it is assumed that the server apparatus 2 records, for each target object as an item, at least one piece of recommended direction information indicating an appropriate direction to capture an image of the target object, in association with information regarding the name or the like of the target object. Also, it is assumed that, when the server apparatus 2 receives a request for the recommended direction information together with information for identifying the target object to be imaged from the image processing apparatus 1, the server apparatus 2 obtains, in response to the request, the recommended direction information associated with information regarding the name or the like of the target object identified by the received information and transmits the obtained recommended direction information to the image processing apparatus 1 that is a request source.

Incidentally, as described above, it is assumed that the recommended direction information for each of items indicates a direction which is statistically determined to contribute to a relatively excellent sale, on the basis of the imaging direction in which an image of an item of the same type as a corresponding item was captured when the item was provided in the past, and on the basis of information regarding the sale of the item. Here, in the above-described C2C marketplace or the like, information indicating the imaging direction may be attached as metadata to a captured image that is an item image uploaded when the target object is put up for sale as an item. At this time, the imaging direction to be recommended according to the type of the item or the target object is determined on the basis of information which indicates an imaging direction and which accompanies a captured image uploaded in association with the item or the target object of that type.

The user places an item to be put up for sale on the flat surface of a desk or the like in advance. Then, the user operates a smart phone to start the program for making the smart phone function as the image processing apparatus 1. The smart phone thus operates as the image processing apparatus 1.

The image processing apparatus 1 sequentially displays images captured by the imaging unit 16 as captured images on the display unit 14. Further, the image processing apparatus 1 uses the captured image as a processing target image, extracts predetermined feature points from the processing target image, and detects a plane on which the target object is disposed (surface of the desk).

In addition, the image processing apparatus 1 sets XY Cartesian coordinates on the plane with one point on the detected plane as an origin, and further sets the world coordinate system as a virtual XYZ Cartesian coordinate system with a direction normal to the plane as a direction of Z-coordinates. This world coordinate system is not changed, e.g., is not rotated, until the end of the processing.

Further, the image processing apparatus 1 extracts predetermined feature points of the target object from the processing target image and identifies a rectangular parallelepiped circumscribing the imaged target object, as a bounding box. The image processing apparatus 1 selects one surface of the polyhedron, which is the bounding box, as a front surface by such a method as described above. Further, the image processing apparatus 1 defines a y-axis as a direction normal to the front surface, defines an x-axis that is on the plane and that is orthogonal to the y-axis, and defines a z-axis parallel with the Z-axis. Thus, the image processing apparatus 1 sets an xyz Cartesian coordinate system of the target object (target object coordinate system).

The image processing apparatus 1 then obtains the item name of the target object by the processing of comparison with a captured image of an object registered in advance or other processing.

Figure 5:
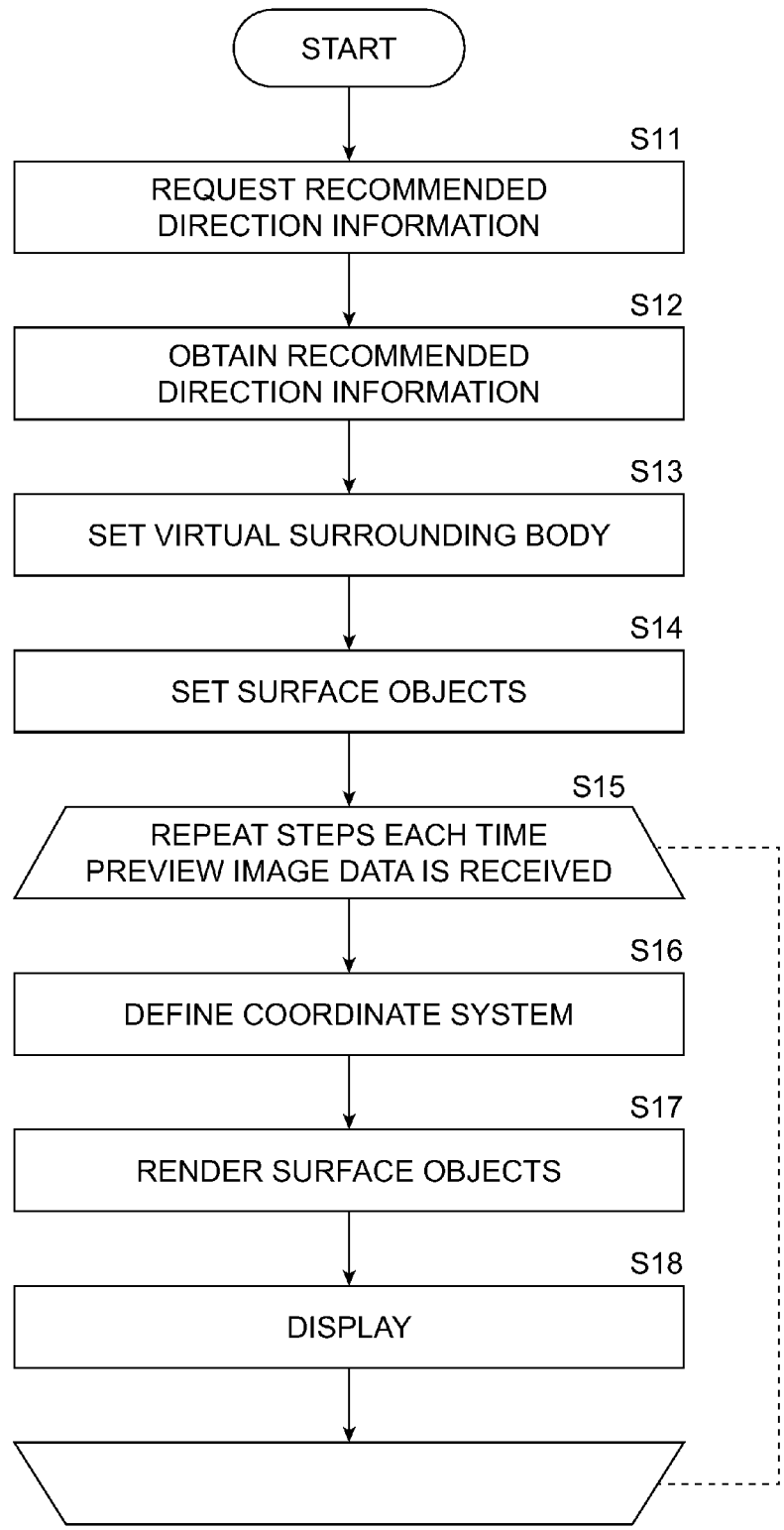
FIG. 5 is a flowchart diagram illustrating an example of operation of the image processing apparatus according to the embodiment of the present disclosure.

Thereafter, the image processing apparatus 1 starts the processing illustrated in FIG. 5. The image processing apparatus 1 transmits the previously obtained item name of the target object to the server apparatus 2, and requests recommended direction information from the server apparatus 2 (S11). The image processing apparatus 1 then obtains the recommended direction information transmitted by the server apparatus 2 in response to the request (S12).

When the image processing apparatus 1 obtains a captured image, the image processing apparatus 1 sets a virtual surrounding body of a hemispherical shape that circumscribes a bounding box surrounding the target object appearing in the captured image or that includes the bounding box therein (S13).

The image processing apparatus 1 divides a surface of the hemisphere set in step S13 into a plurality of surface objects (S14). In this case, it is assumed that each of the surface objects has a flat surface, and the shape and position of each of the surface objects are expressed in the target object coordinate system.

Thereafter, each time the image processing apparatus 1 receives a captured image (S15), the image processing apparatus 1 defines each axial direction of the world coordinate system in the captured image by such a method as feature point tracking (S16).

In addition, the image processing apparatus 1 renders the surface objects in order of decreasing distance from a viewpoint in the target object coordinate system corresponding to the world coordinate system defined here (S17). At this time, for each direction indicated by the recommended direction information obtained in step S12, the image processing apparatus 1 identifies a surface object having a normal extending in a direction that is the closest to the direction indicated by the recommended direction information. At least one surface object identified on the basis of the direction indicated by the recommended direction information and the other surface objects (which are not identified) are rendered as rectangles in such a manner that the one surface object is filled with a certain color and the other surface objects are filled with a different color.

Then, the image processing apparatus 1 translucently synthesizes an image of the rendered surface objects with the captured image received in step S15 and displays a resulting image (S18).

Figure 6A:
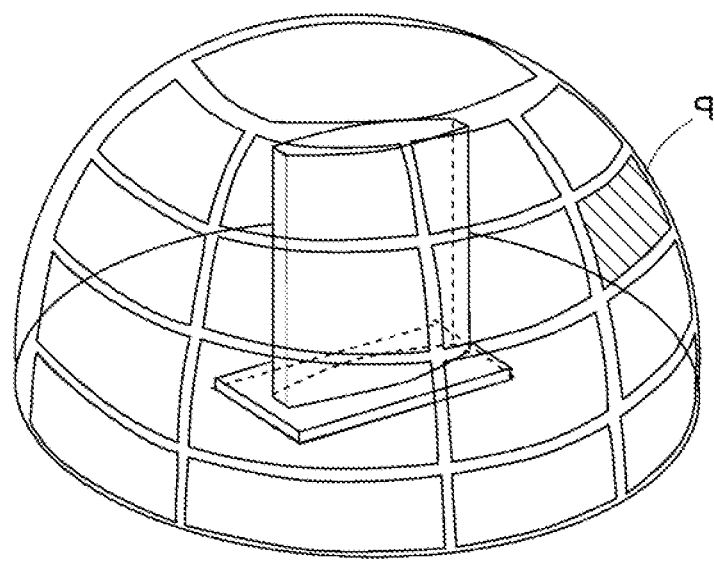
FIGS. 6A and 6B are explanatory diagrams illustrating an example of a screen displayed on the image processing apparatus according to the embodiment of the present disclosure.
Figure 6B:
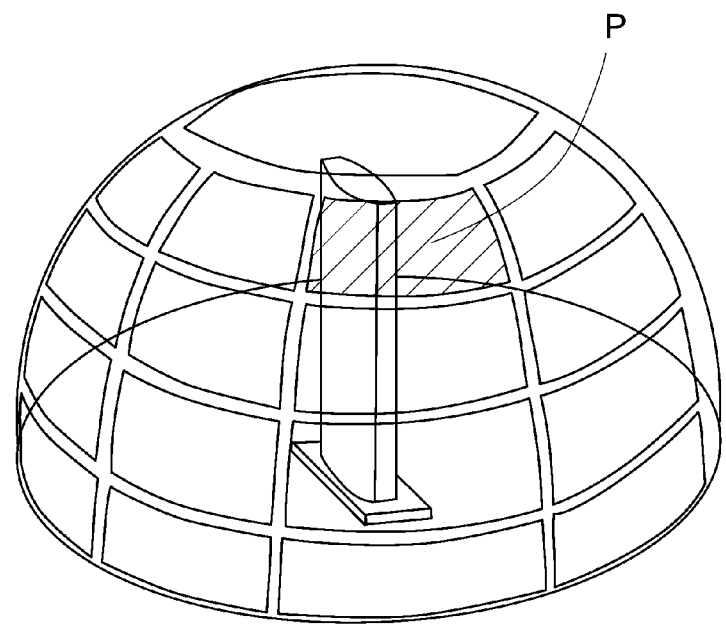

Consequently, as illustrated in FIGS. 6A and 6B, the user can recognize, as a recommended direction, a direction in which a surface object having a different color among the plurality of surface objects arranged on a spherical shape is located. In the present example, while an image of the target object is captured in a direction different from the direction indicated by the recommended direction information, a surface object (P) representing the direction indicated by the recommended direction information is displayed in another direction, as illustrated in FIG. 6A. On the other hand, when the user adjusts the direction and captures an image of the target object in the direction indicated by the recommended direction information, the surface object having the different color and present in a direction close to the direction indicated by the recommended direction information is superimposed and displayed on the target object, as illustrated in FIG. 6B. The user may check the display and perform intention input (shutter operation or the like) to record the captured image. Incidentally, the image of the virtual surrounding body or the like is not synthesized with the captured image recorded by the image processing apparatus 1 in response to this input.

Incidentally, while surface objects on the back side of the target object are not illustrated to facilitate viewing of illustrations in the examples of FIGS. 6A and 6B, the surface objects on the back side may also be rendered in practice. Further, while the hemisphere is divided into four parts in a latitude direction in the examples of FIGS. 6A and 6B, the number of such divisions is determined as desired as long as the number is an integer of 2 or more, and the hemisphere may be divided into more parts. Similarly, the number of divisions in a longitude direction is also determined as desired as long as the number is an integer of 2 or more.

When the image processing apparatus 1 receives the intention input from the user, the image processing apparatus 1 stores, in the storage unit 12, the image captured by the imaging unit 16 at the time point. In addition, the image processing apparatus 1 uploads the captured image thus stored, as a captured image of the item to the server apparatus 2 according to an instruction from the user.

Thus, according to the present embodiment, it is possible to capture an image of the target object in a direction in which the user views the target object through a surface object different in color from the other surface objects while checking the image displayed on the display unit 14, so that the imaging direction can specifically be indicated. In addition, it is thus possible to capture an image of the target object in the direction set as an appropriate direction.

<Modifications of Shape of Virtual Surrounding Body>

Figure 7:
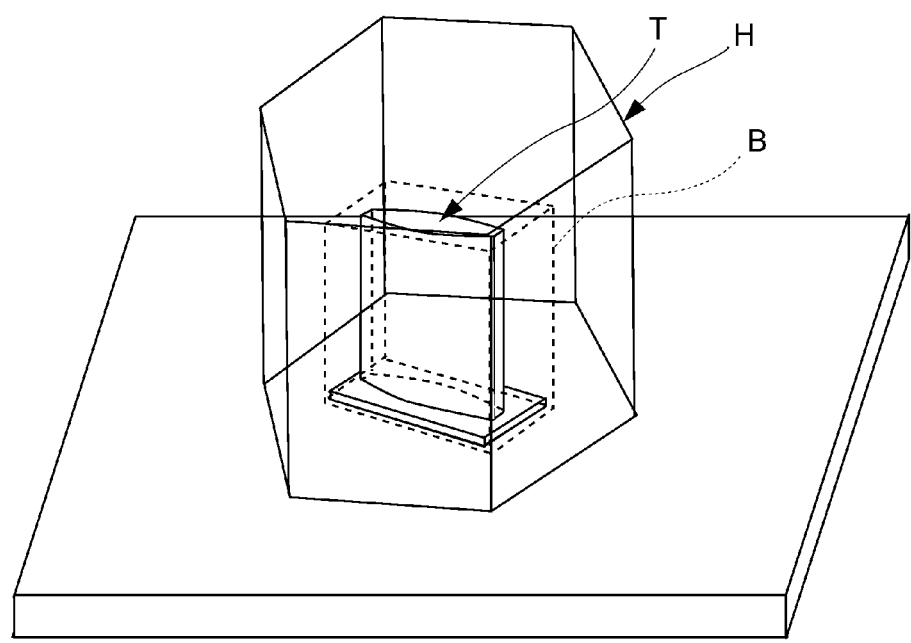
FIG. 7 is an explanatory diagram illustrating another example of the virtual surrounding body set by the image processing apparatus according to the embodiment of the present disclosure.

In addition, in the present embodiment, the shape of the virtual surrounding body is not limited to a hemisphere as described above. The virtual surrounding body may have, for example, the shape of a polygonal prism such as a hexagonal prism or an octagonal prism as illustrated in FIG. 7, or may be of a shape obtained by combining polygons with one another, such as the shape of a soccer ball. In FIG. 7, a hexagonal prism (H) shape is illustrated by way of example.

Further, in a case where the virtual surrounding body is divided into a plurality of surface objects, the divided surface objects may have shapes different from each other. Incidentally, it is conceivable that, depending on the method of dividing a virtual surrounding body into surface objects, a virtual surrounding body having a relatively large surface, such as a columnar body, may be divided into a plurality of surface objects having normals extending in identical directions. It is to be noted that, as described above, each of the plurality of surface objects herein may have a rectangular shape or a triangular shape and does not necessarily need to have the same area, and that the geometric feature and area of each of the plurality of surface objects are not limited to particular ones.

Accordingly, in a case where a virtual surrounding body is divided into a plurality of surface objects having normals extending in the identical directions, the image processing apparatus 1 may group the plurality of surface objects having the normals extending in the identical directions, as one surface object. That is, when a surface object having a normal closest to a direction included in the recommended direction information is selected and there is another surface object having a normal extending in the same direction as the selected surface object, the image processing apparatus 1 treats the other surface object as a selected surface object.

In addition, in the description thus far, the server apparatus 2 retains the database and provides information regarding a direction determined to be appropriate, in response to a request from the image processing apparatus 1. However, the present embodiment is not limited to this.

That is, in another example of the present embodiment, the storage unit 12 of the image processing apparatus 1 may store the database in which recommended direction information indicating appropriate directions to capture images of target objects is recorded in association with information regarding the names or the like of the target objects.

In this case, instead of transmitting the name of a target object and obtaining the recommended direction information, the image processing apparatus 1 obtains the recommended direction information corresponding to the name of the recognized target object from the database stored in the storage unit 12 and uses the recommended direction information to indicate a direction.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   at least one memory configured to store program code;
   at least one processor configured to operate as instructed by the program code, the program code including:
   receiving code configured to cause at least one of the at least one processor to receive a captured image of a target object;
   recognizing code configured to cause at least one of the at least one processor to perform recognition of the target object by extracting feature points of the target object on a basis of the captured image;
   recommending code configured to cause at least one of the at least one processor to provide recommendation regarding an imaging direction on a basis of a type of the target object, and on a basis of an imaging direction previously used for the type of the target object in a predetermined trade history;
   instruction code configured to cause at least one of the at least one processor to provide an instruction on a specific direction to capture an image of the target object, on a basis of a result of the recognition and a result of the recommendation;
   display code configured to cause at least one of the at least one processor to cause a display to display a 3D virtual surrounding body including the feature points of the target object in such a manner as to superimpose the 3D virtual surrounding body on the target object on a basis of the result of the recognition and to display, in a highlighted manner, a region of the 3D virtual surrounding body corresponding to the imaging direction based on the instruction; and
   object setting code configured to cause at least one of the at least one processor to divide a surface of the 3D virtual surrounding body into a plurality of surface objects to create a mesh, and obtain surface object information regarding coordinates for the surface objects,
   wherein the recommendation is based in part on the surface object information.

2. The image processing apparatus according to claim 1, wherein
   the recognizing code is configured to cause at least one of the at least one processor to perform identification of the type of the target object by performing the recognition, and the recommending code is configured to cause at least one of the at least one processor to perform the recommendation on a basis of a result of the identification.

3. The image processing apparatus according to claim 1, wherein
the recommending code is configured to cause at least one of the at least one processor to perform the recommendation on a basis of each of imaging directions in which images of target objects of the identical type were captured in the past.

4. The image processing apparatus according to claim 1, wherein
the recommending code is configured to cause at least one of the at least one processor to perform the recommendation on a basis of the imaging direction that relates to the captured image of the target object having the predetermined trade history selected on a basis of an elapsed time from putting up of the target object for sale to closing of a deal.

5. The image processing apparatus according to claim 1, wherein
the recommending code is configured to cause at least one of the at least one processor to perform the recommendation on a basis of an imaging direction that is one of imaging directions in which images of target objects of the identical type were captured in the past and that corresponds to an imaging direction related to a captured image selected on a basis of the number of views of item pages containing the captured images of the target objects.

6. The image processing apparatus according to claim 1, wherein
the 3D virtual surrounding body includes a plurality of surface objects, and
the display code is configured to cause at least one of the at least one processor to cause the display to display, in a highlighted manner, one of the surface objects that corresponds to the imaging direction based on the instruction.

7. An image processing method performed by at least one processor and comprising:
receiving a captured image of a target object;
performing recognition of the target object by extracting feature points of the target object on a basis of the captured image;
giving recommendation regarding an imaging direction on a basis of a type of the target object, and on a basis of an imaging direction previously used for the type of the target object in a predetermined trade history;
giving a user an instruction on a specific direction to capture an image of the target object, on a basis of a result of the recognition and a result of the recommendation;
displaying a 3D virtual surrounding body including the feature points of the target object in such a manner as to superimpose the 3D virtual surrounding body on the target object on a basis of the result of the recognition and to display, in a highlighted manner, a region of the 3D virtual surrounding body corresponding to the imaging direction based on the instruction; and
dividing a surface of the 3D virtual surrounding body into a plurality of surface objects to create a mesh, and obtaining surface object information regarding coordinates for the surface objects,
wherein the recommendation is based in part on the surface object information.

8. The method according to claim 7, further comprising:
causing a display to display a 3D virtual surrounding body including the feature points of the target object in such a manner as to superimpose the 3D virtual surrounding body on the target object on a basis of the result of the recognition and to display, in a highlighted manner, a region of the 3D virtual surrounding body corresponding to the imaging direction based on the instruction; and
dividing a surface of the 3D virtual surrounding body into a plurality of surface objects to create a mesh, and obtain surface object information regarding coordinates for the surface objects,
wherein the recommendation is based in part on the surface object information.

9. A computer-readable non-transitory storage medium which stores a program that when executed by a computer, causes the computer to:
receive a captured image of a target object;
perform recognition of the target object by extracting feature points of the target object on a basis of the captured image;
give recommendation regarding an imaging direction on a basis of a type of the target object, and on a basis of an imaging direction previously used for the type of the target object in a predetermined trade history;
give an instruction on a specific direction to capture an image of the target object, on a basis of a result of the recognition and a result of the recommendation;
display a 3D virtual surrounding body including the feature points of the target object in such a manner as to superimpose the 3D virtual surrounding body on the target object on a basis of the result of the recognition and to display, in a highlighted manner, a region of the 3D virtual surrounding body corresponding to the imaging direction based on the instruction; and
divide a surface of the 3D virtual surrounding body into a plurality of surface objects to create a mesh, and obtain surface object information regarding coordinates for the surface objects,
wherein the recommendation is based in part on the surface object information.

10. The computer-readable non-transitory storage medium according to claim 9, wherein the program code further causes the computer to:
cause a display to display a 3D virtual surrounding body including the feature points of the target object in such a manner as to superimpose the 3D virtual surrounding body on the target object on a basis of the result of the recognition and to display, in a highlighted manner, a region of the 3D virtual surrounding body corresponding to the imaging direction based on the instruction; and
divide a surface of the 3D virtual surrounding body into a plurality of surface objects to create a mesh, and obtain surface object information regarding coordinates for the surface objects,
wherein the recommendation is based in part on the surface object information.

* * * * *